US011027386B2

(12) United States Patent
Murota (10) Patent No.: US 11,027,386 B2
(45) Date of Patent: Jun. 8, 2021

(54) SPINDLE DEVICE

(71) Applicant: FANUC CORPORATION, Yamanashi (JP)

(72) Inventor: Masahiro Murota, Yamanashi-ken (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 16/661,109

(22) Filed: Oct. 23, 2019

(65) Prior Publication Data

US 2020/0130121 A1    Apr. 30, 2020

(30) Foreign Application Priority Data

Oct. 25, 2018 (JP) .............................. JP2018-200881

(51) Int. Cl.
*B23Q 5/10*        (2006.01)
*B23Q 11/12*       (2006.01)
*B23Q 1/70*        (2006.01)

(52) U.S. Cl.
CPC ..................................... *B23Q 5/10* (2013.01)

(58) Field of Classification Search
CPC . B23Q 3/088; B23Q 3/08; B23Q 5/06; B23Q 5/08; B23Q 5/261; B23B 31/001; B23B 31/30; B23B 31/10; B23B 31/302; B23B 31/307; Y10T 279/11
See application file for complete search history.

(56) References Cited

U.S. PATENT DOCUMENTS

| | | | | |
|---|---|---|---|---|
| 3,306,375 A | * | 2/1967 | Macks | ..................... A61C 1/05 173/59 |
| 5,626,675 A | * | 5/1997 | Sakamoto | ........... H01L 21/6715 118/663 |
| 6,840,723 B2 | * | 1/2005 | Jacobsson | ................ B23Q 5/06 408/124 |
| 10,293,443 B1 | * | 5/2019 | Ekhoff | ................. H05K 3/0055 |
| 2003/0094864 A1 | * | 5/2003 | Watanabe | .......... B23Q 11/0883 310/58 |

(Continued)

FOREIGN PATENT DOCUMENTS

| JP | S59042804 U | 3/1984 |
|---|---|---|
| JP | S60094266 A | 5/1985 |

(Continued)

OTHER PUBLICATIONS

Machine Translation of IDS provided reference JP 2014-42945 A, pp. 5-11 (Year: 2020).*

(Continued)

*Primary Examiner* — Nicole N Ramos
(74) *Attorney, Agent, or Firm* — Fredrikson & Byron, P.A.

(57) ABSTRACT

A spindle device includes a spindle shaft, a spindle housing, and a chuck portion as a rotating member. The chuck portion has, formed therein, a suctioning passage through which air suctioned from the outside flows. The spindle shaft has a first guide passage which guides air flowing through the suctioning passage to a clearance between the inner wall of the spindle housing defining a through hole in which the spindle shaft is inserted and the outer wall of the spindle shaft facing the inner wall, by way of the interior of the spindle shaft. The spindle housing has, formed therein, a second guide passage configured to guide the air guided to the clearance, to the outside.

4 Claims, 7 Drawing Sheets

(56) References Cited

U.S. PATENT DOCUMENTS

| | | | | |
|---|---|---|---|---|
| 2009/0252594 A1* | 10/2009 | Itoh | ................ | F01D 25/16 415/110 |
| 2011/0280679 A1* | 11/2011 | Morimura | ............ | B23Q 11/127 409/135 |
| 2014/0294523 A1* | 10/2014 | Ueda | ................ | B23Q 3/12 407/47 |
| 2015/0020666 A1* | 1/2015 | Wakita | ................ | B27B 5/32 83/401 |
| 2015/0033918 A1* | 2/2015 | Lindner | ............ | B23Q 16/00 82/1.11 |
| 2016/0207216 A1* | 7/2016 | Nitta | ................ | B23B 31/307 |
| 2018/0021907 A1* | 1/2018 | Suzuki | ................ | B23Q 5/10 173/217 |
| 2019/0084175 A1* | 3/2019 | Sekiya | ............ | H01L 21/67092 |

FOREIGN PATENT DOCUMENTS

| | | | |
|---|---|---|---|
| JP | S62193704 | A | 8/1987 |
| JP | 2002066854 | A | 3/2002 |
| JP | 2002224924 | A | 8/2002 |
| JP | 2004230496 | A | 8/2004 |
| JP | 2009113156 | A | 5/2009 |
| JP | 201442945 | A | 3/2014 |

OTHER PUBLICATIONS

English Abstract and Machine Translation for Japanese Publication No. 2014-042945 A, published Mar. 13, 2014, 7 pgs.
Partial English Machine Translation for Japanese Publication No. JPS59-042804U, published Mar. 21, 1984, 3 pgs.
English Abstract and Machine Translation for Japanese Publication No. JPS60-094266A, published May 27, 1985, 4 pgs.
English Abstract and Machine Translation for Japanese Publication No. JPS62-193704A, published Aug. 25, 1987, 6 pgs.
English Abstract and Machine Translation for Japanese Publication No. JP2002-066854A, published Mar. 5, 2002, 7 pgs.
English Abstract and Machine Translation for Japanese Publication No. JP2002-224924A, published Aug. 13, 2002, 6 pgs.
English Abstract and Machine Translation for Japanese Publication No. JP2004-230496A, published Aug. 19, 2004, 9 pgs.
English Abstract and Machine Translation for Japanese Publication No. JP2009-113156A, published May 28, 2009, 14 pgs.
Untranslated Notification of Reasons for Refusal mailed by Japan Patent Office (JPO) for Application No. JP2018-200881, dated Aug. 25, 2020, 6 pgs.
English Machine Translation of Notification of Reasons for Refusal mailed by Japan Patent Office (JPO) for Application No. JP2018-200881, dated Aug. 25, 2020, 7 pgs.

* cited by examiner

SPINDLE DEVICE

CROSS-REFERENCE TO RELATED APPLICATION

This application is based upon and claims the benefit of priority from Japanese Patent Application No. 2018-200881 filed on Oct. 25, 2018, the contents of which are incorporated herein by reference.

BACKGROUND OF THE INVENTION

Field of the Invention

The present invention relates to a spindle device used in a lathe (machine tool) that machines a workpiece using a tool.

Description of the Related Art

There are spindle devices that machine a workpiece by turning the spindle shaft while holding the workpiece at one end of the spindle shaft by means of a vacuum chuck mechanism. Japanese Laid-Open Patent Publication No. 2014-042945 discloses a workpiece holding device as such a spindle device.

In the workpiece holding device disclosed in Japanese Laid-Open Patent Publication No. 2014-042945, a vacuum chuck mechanism is disposed on one end side of a rotary shaft while a rotary joint for connecting an air suction circuit and the rotary shaft is disposed on the other end side of the rotary shaft. This rotary joint has a noncontact sealing structure that creates sealing between itself and the outer peripheral surface of the rotary shaft when the air suction circuit is driven to draw the air from the outside into the flow path in the spindle shaft through the vacuum chuck mechanism. Thus, in this configuration, sealing can be done without use of a physical seal member.

SUMMARY OF THE INVENTION

In this workpiece holding device in Japanese Laid-Open Patent Publication No. 2014-042945, a motor is provided on the other end side of the spindle shaft opposite to the one end side where the vacuum chuck mechanism is disposed. For this reason, heat generated in the motor is liable to transmit through the spindle shaft, and tends to cause a temperature difference between the spindle shaft and the housing enclosing the spindle shaft. If this temperature difference increases, there is a risk that geometries such as the clearance between bearings provided in the housing and the spindle shaft supported by the bearings may change, thereby lowering machining accuracy.

It is therefore an object of the present invention to provide a spindle device that can restrain a decrease in machining accuracy.

An aspect of the present invention resides in a spindle device, which includes: a spindle housing having a through hole; a spindle shaft inserted in the through hole; a rotating member disposed at one end of the spindle shaft and configured to rotate in linkage with the rotation of the spindle shaft; and a motor disposed at another end of the spindle shaft and configured to rotate the spindle shaft, wherein: the rotating member has, formed therein, a suctioning passage through which air suctioned from the outside flows; the spindle shaft has a first guide passage configured to guide air flowing through the suctioning passage to a clearance between the inner wall of the spindle housing defining the through hole and the outer wall of the spindle shaft facing the inner wall, by way of the interior of the spindle shaft, and the spindle housing has, formed therein, a second guide passage configured to guide air guided to the clearance, to the outside of the spindle housing.

According to the present invention, the outer wall of the spindle shaft can be cooled when air suctioned from the outside flows from the first guide passage to the second guide passage. Therefore, the temperature difference arising between the spindle shaft and the spindle housing in which the spindle shaft is inserted can be reduced, and as a result, it is possible to prevent a decrease in machining accuracy.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

The present invention will be detailed below by describing a preferred embodiment with reference to the accompanying drawings.

Embodiment

Figure 1:
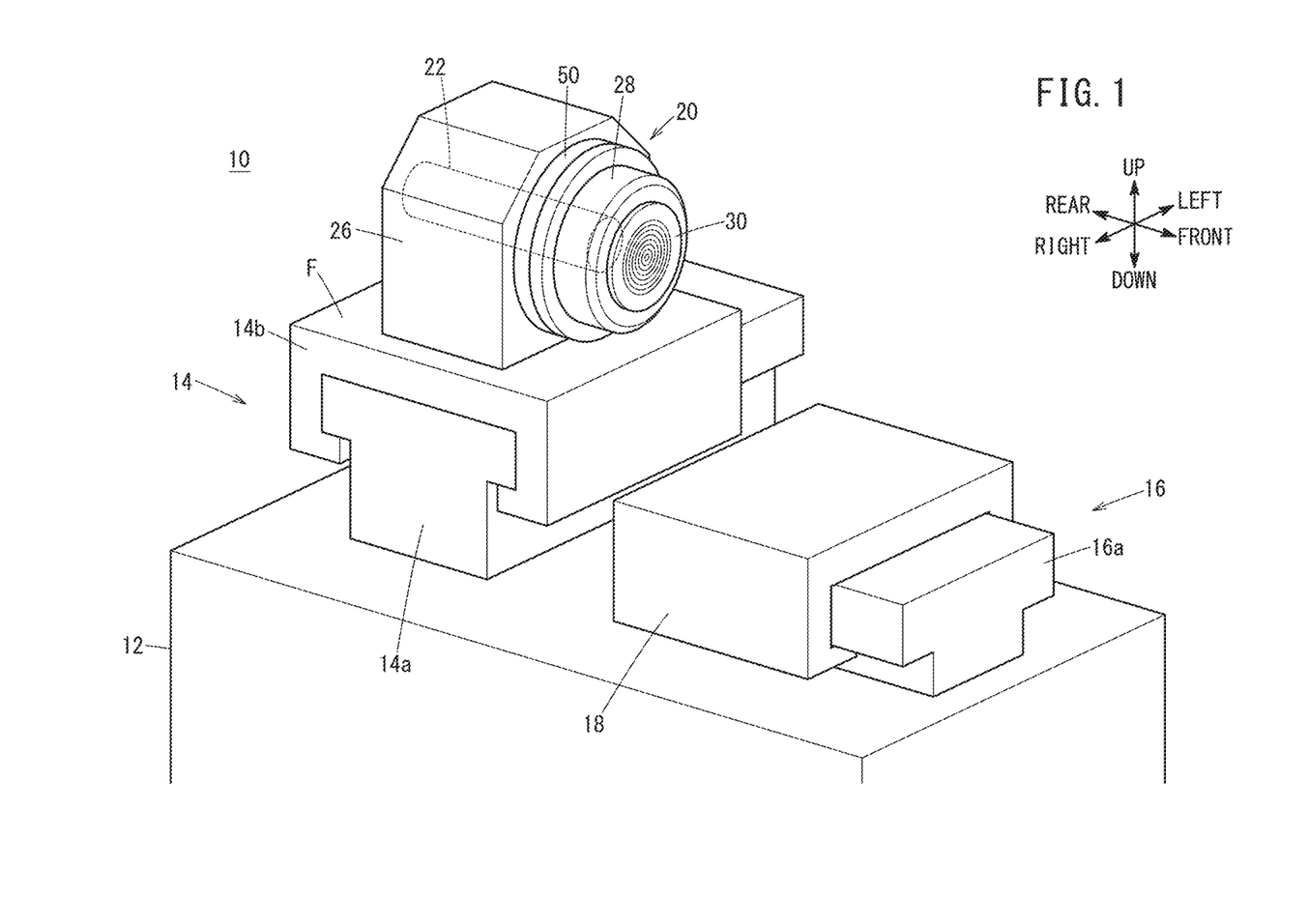
FIG. 1 is a schematic diagram showing a lathe according to the present embodiment.

FIG. 1 is a schematic view showing an appearance configuration of a lathe machine 10. The lathe machine 10 is used to machine a workpiece to be machined, using a tool, and includes a base bed 12, a spindle support 14, a table support 16, a table 18 and a spindle device 20.

The spindle support 14 is provided on the base bed 12 to support the spindle device 20 such that the spindle device can move left and right relative to the base bed 12. Here, the direction (axial direction) in which a spindle shaft 22 of the spindle device 20 extends is referred to as the front-rear direction, the direction perpendicular to the axial direction in a plane parallel to a mounting surface F on which the spindle device 20 is mounted is referred to as the left-right direction, and the direction perpendicular to the mounting surface and the axial direction is referred to as the up-down direction. The downward direction is the direction of gravity. Further, in the spindle device 20, one end side of the spindle shaft 22 on which a chuck portion 30 is mounted is referred to as the front side, whereas the other end side of the spindle shaft 22 is referred to as the rear side.

The spindle support 14 includes a first slider 14a arranged along the left-right direction on the base bed 12, a spindle carriage 14b movable along the first slider 14a and an unillustrated first drive mechanism for driving the spindle carriage 14b.

The first drive mechanism includes a motor and components such as a ball screw that converts the rotational motion of the motor into a linear motion. As the spindle carriage 14b is moved along the first slider 14a by the first drive mechanism, the spindle device 20 on the spindle carriage 14b moves left and right relative to the base bed 12.

The table support 16 is arranged on the base bed 12 to movably support the table 18 in the front-rear direction with respect to the base bed 12. The table support 16 includes a second slider 16a provided along the front-rear direction on the base bed 12 and an unillustrated second drive mechanism for driving the table 18 that is movable along the second slider 16a.

The second drive mechanism includes a motor and components such as a ball screw that converts the rotational motion of the motor into a linear motion. The table 18 is moved in the front-rear direction relative to the base bed 12 through the second slider 16a by the second drive mechanism. The table 18 may be provided rotatably about a vertical axis as a rotation axis.

In the present embodiment, it is assumed that a workpiece is held by the chuck portion 30 of the spindle device 20 while a tool is held by the table 18. However, the tool may be held by the chuck portion 30 in the spindle device 20 while the workpiece may be held by the table 18.

Figure 2:
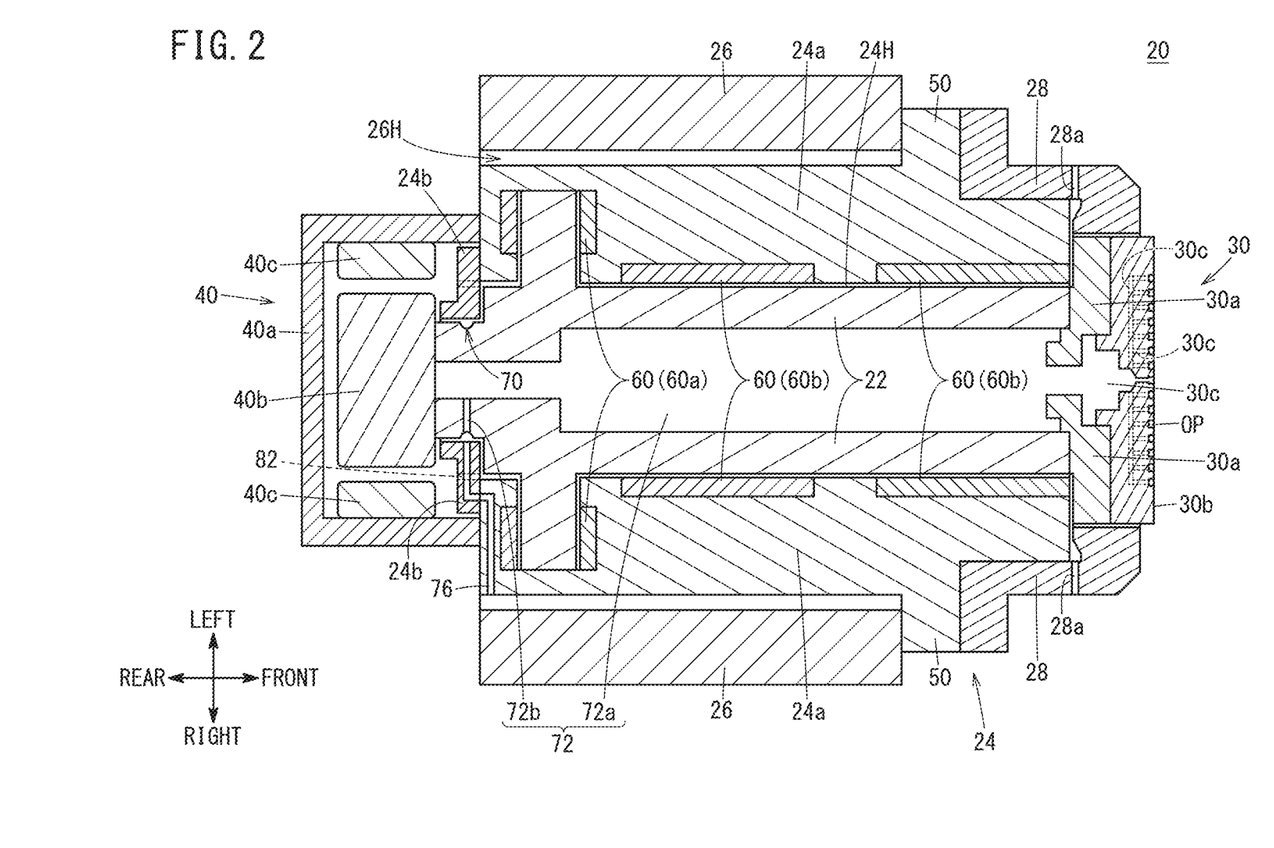
FIG. 2 is a schematic diagram showing a cross section of the spindle device of FIG. 1.

FIG. 2 is a diagram showing a cross section of the spindle device 20 of FIG. 1. The spindle device 20 of the present embodiment rotatably holds a workpiece, and is used, for example, to machine the workpiece at nanometer-scale control. The spindle device 20 contains, as main components, the spindle shaft 22, a spindle housing 24, a spindle mount 26 and a cover member 28.

The spindle shaft 22 is a rod-shaped member. The chuck portion 30 is arranged on the one end side (front side) of the spindle shaft 22 and a motor 40 is arranged on the other end side (rear side).

The chuck portion 30 is a rotating member that is provided at the one end of the spindle shaft 22 so as to turn together with the rotation of the spindle shaft 22 at the front side of the spindle housing 24. Here, in FIG. 1, although the chuck portion 30 is formed into a disk shape, it may have another shape. The chuck portion 30 has a base 30a fixed on the front side of the spindle shaft 22 and a suction pad 30b detachably attached to the base 30a. Suctioning passages 30c through which air drawn in from the outside flows are formed in the base 30a and the suction pad 30b. Multiple suction openings or suction ports OP of the suctioning passages 30c are formed on the suction surface side of the suction pad 30b.

The motor 40 is configured to rotate the spindle shaft 22 and includes a motor case 40a attached on the rear side of the spindle housing 24, and a rotor 40b and a stator 40c provided inside the motor case 40a. The spindle shaft 22 is fixed to the rotor 40b. Therefore, the spindle shaft 22 rotates together with the rotor 40b.

The spindle housing 24 has a through hole 24H, and rotatably supports the spindle shaft 22 inserted through the through hole 24H. The spindle housing 24 has a housing body 24a.

The housing body 24a has, provided on a front side thereof, an annular flange portion 50 projecting outward from the outer peripheral surface of the housing body 24a.

The motor case 40a of the motor 40 is fixed to the rear end face of the housing body 24a. In the example shown in FIG. 2, the flange portion 50 is formed integrally with the housing body 24a. However, the flange portion 50 may be formed as a separate body from the housing body 24a and fixed to the housing body 24a by predetermined fasteners.

The housing body 24a is formed with the through hole 24H that penetrates the housing body 24a in the front-rear direction. The spindle shaft 22 is inserted in the through hole 24H, and the spindle shaft 22 inserted in the through hole 24H is rotatably supported by bearings 60.

The bearings 60 are hydrostatic bearings that rotatably support the spindle shaft 22 by compressed gas and arranged in the housing body 24a. In the present embodiment, the bearings 60 include thrust bearings 60a and radial bearings 60b. The thrust bearing 60a is arranged on each of the left side and the right side of the spindle shaft 22. The radial bearings 60b are arranged on the front and rear sides of one-end-side portion of the spindle shaft 22 that is located at the front side (i.e., one end side) of the thrust bearings 60a.

Compressed gas is supplied to the bearings 60 through an unillustrated flow path formed in the housing body 24a. The compressed gas supplied to each bearing 60 flows from the bearing 60 to a bearing gap between the inner ring of the bearing 60 and the outer wall of the spindle shaft 22 and acts as a support for the spindle shaft 22. Therefore, the bearing 60 and the spindle shaft 22 are kept out of contact with each other via the compressed gas. The compressed gas flowing through the bearing gap is discharged to the outside through an unillustrated discharge path formed in the housing body 24a.

The spindle mount 26 is placed on the mounting surface F (FIG. 1) of the spindle carriage 14b. The spindle mount 26 has an insertion cavity 26H into which the spindle housing 24 is inserted along the axial direction of the spindle shaft 22. The front side of the spindle housing 24 inserted in the insertion cavity 26H is fixed to the front side of the spindle mount 26 by the flange portion 50 provided on the housing body 24a. Specifically, the flange portion 50 is detachably fixed to the front side (one opening side of the insertion cavity 26H) of the spindle mount 26 by rod-shaped fasteners such as bolts.

The cover member 28 is provided to cover the front side surface of the flange portion 50, the outer peripheral surface of the housing body 24a extending forward from the flange surface and part of the outer peripheral surface of the chuck portion 30. Although the cover member 28 covers part of the outer peripheral surface of the chuck portion 30, it may be arranged so as to cover either the whole of the outer peripheral surface or at least a part of the outer peripheral surface of the chuck portion 30.

The cover member 28 has, formed therein, a gas flow passage 28a for flowing a seal gas in order to seal a seal portion to be sealed (also simply referred to as a sealed portion). The sealed portion is a gap between the chuck portion 30 and the cover member 28 and a gap between the chuck portion 30 and the housing body 24a. The seal gas may be compressed to a predetermined pressure. Specific examples of the seal gas include air and others. By supplying the seal gas to the sealed portion, it is possible to prevent chips generated during machining of the workpiece, coolant used at the time of machining, etc., from entering the interior of the spindle housing 24 through the sealed portion. The seal gas having flowed into the sealed portion is discharged to the outside from the front side of the spindle device 20 and others.

Further, an unillustrated coolant flow passage for flowing the coolant is formed in the cover member 28, so that the coolant flowing through the coolant flow passage adjusts the temperature of the cover member 28. The coolant is, for example, water, air or the like.

Figure 3:
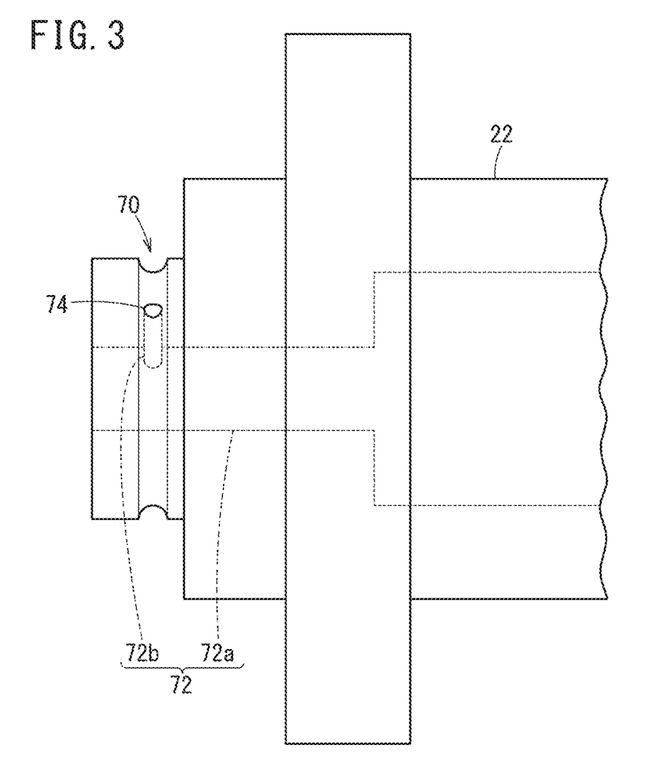
FIG. 3 is a schematic diagram showing part of the spindle shaft of FIG. 1.

FIG. 3 is a schematic diagram showing part of the spindle shaft 22 of FIG. 1. The spindle shaft 22 of this embodiment has a groove 70 formed in the outer peripheral wall of the spindle shaft 22. The groove 70 is formed annularly along the peripheral surface of the spindle shaft 22. An outflow port 74 of the first guide passage 72 is formed at the bottom of the groove 70. The bottom of the groove 70 is a depressed portion of the outer wall of the spindle shaft 22 that forms the groove 70.

As shown in FIGS. 2 and 3, the first guide passage 72 guides the air flowing through the suctioning passages 30c of the chuck portion 30 to the inner and outer wall clearance, by way of the interior of the spindle shaft 22. The inner and outer wall clearance is a gap between the inner wall of the spindle housing 24 that forms the through hole 24H into which the spindle shaft 22 is inserted and the outer wall of the spindle shaft 22 that faces the inner wall.

The first guide passage 72 specifically has a first passage portion 72a and a second passage portion 72b. The first passage portion 72a extends inside the spindle shaft 22 along the axial direction of the spindle shaft 22 and communicates with the suctioning passages 30c of the chuck portion 30. In the example shown in FIGS. 2 and 3, the front part of the first passage portion 72a is formed wider than the rear part.

The second passage portion 72b is formed inside the spindle shaft 22 so as to extend in the radial direction of the spindle shaft 22 from the first passage portion 72a to the inner and outer wall clearance to establish communication therebetween. The outlet of the second passage portion 72b is the outflow port 74 of the first guide passage 72. The inner wall of the spindle housing 24 is specifically the wall portion of the housing body 24a that defines the through hole 24H, as shown in FIG. 2.

Figure 4:
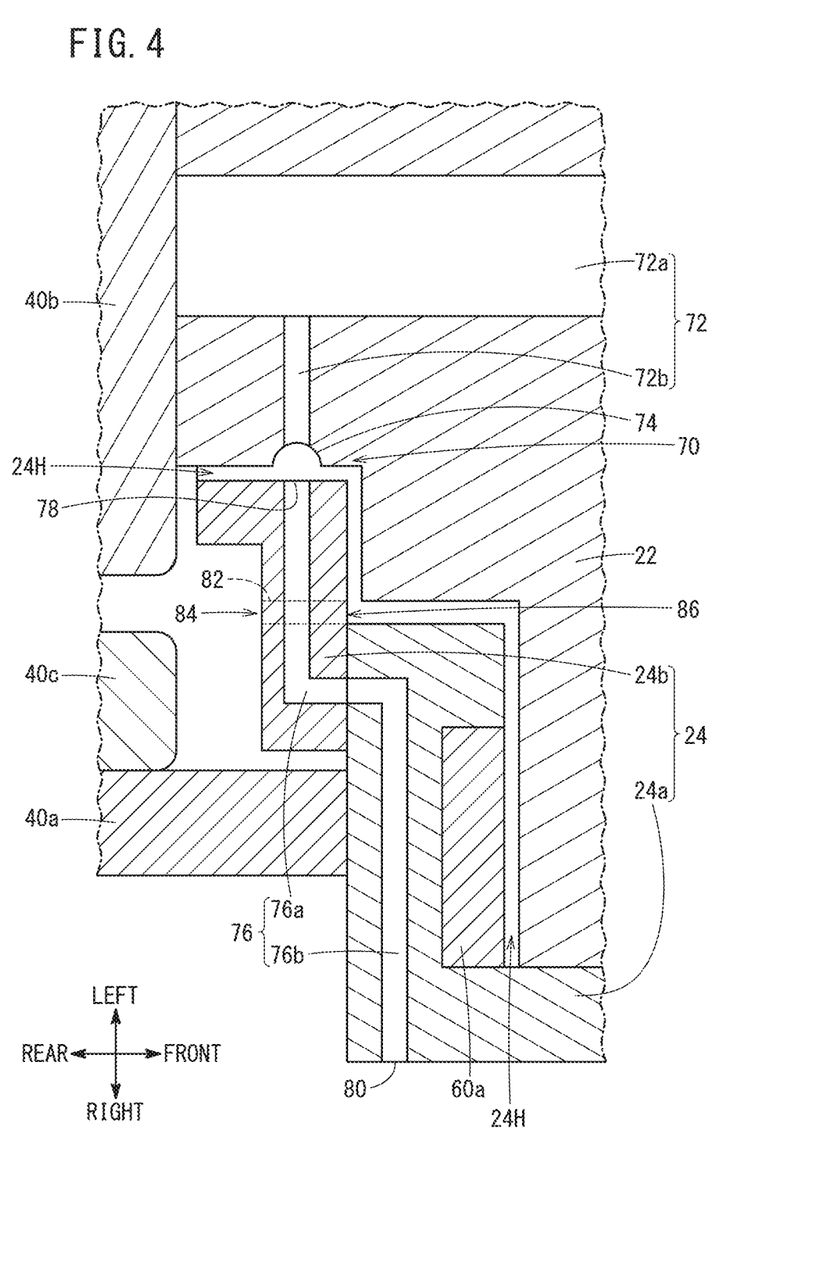
FIG. 4 is an enlarged schematic diagram showing part of the spindle device of FIG. 2.

FIG. 4 is an enlarged diagram schematically showing part of the spindle device 20 of FIG. 2. As shown in FIGS. 2 and 4, the spindle housing 24 has a joint portion 24b in addition to the housing body 24a. The joint portion 24b is a housing part for creating a joint with the first guide passage 72 formed in the spindle shaft 22 and is arranged inside the motor case 40a. That is, the joint portion 24b is covered by the motor case 40a.

This joint portion 24b is provided so as to cover an outer peripheral surface of part of the spindle shaft 22 that projects rearward from the housing body 24a, and is attached to the rear end face of the housing body 24a. The groove 70 is located in the outer wall of the spindle shaft 22 covered by the joint portion 24b. In the example shown in FIGS. 2 and 4, the joint portion 24b is formed separately from the housing body 24a, but may be formed integrally with the housing body 24a.

A second guide passage 76 is formed in the joint portion 24b and the housing body 24a. The second guide passage 76 is configured to flow the air from the inner and outer wall clearance to the outside of the spindle housing 24. Specifically, the second guide passage 76 includes a joint passage portion 76a formed in the joint portion 24b and a housing passage portion 76b formed in the housing body 24a.

The joint passage portion 76a communicates with the second passage portion 72b of the first guide passage 72 formed in the spindle shaft 22. The inlet of the joint passage portion 76a is an inflow port 78 of the second guide passage 76, and is provided in a wall portion of the joint portion 24b that faces the groove 70 of the spindle shaft 22.

The housing passage portion 76b connects the joint passage portion 76a with the outside of the spindle housing 24. The outlet of the housing passage portion 76b is an outflow port 80 of the second guide passage 76, and is provided on the outer wall of the housing body 24a.

Also, a third guide passage 82 is formed in the joint portion 24b. The third guide passage 82 guides air outside the spindle housing 24 to the inner and outer wall clearance and is formed so as not to communicate with the joint passage portion 76a of the second guide passage 76.

An inflow port 84 of the third guide passage 82 is arranged inside the motor case 40a. An outflow port 86 of the third guide passage 82 is formed on the inner wall of the joint portion 24b located between the inflow port 78 of the second guide passage 76 and the thrust bearing 60a. A tube from an unillustrated suctioning source (vacuum pump) is connected to the outflow port 86 of the third guide passage 82.

Figure 5:
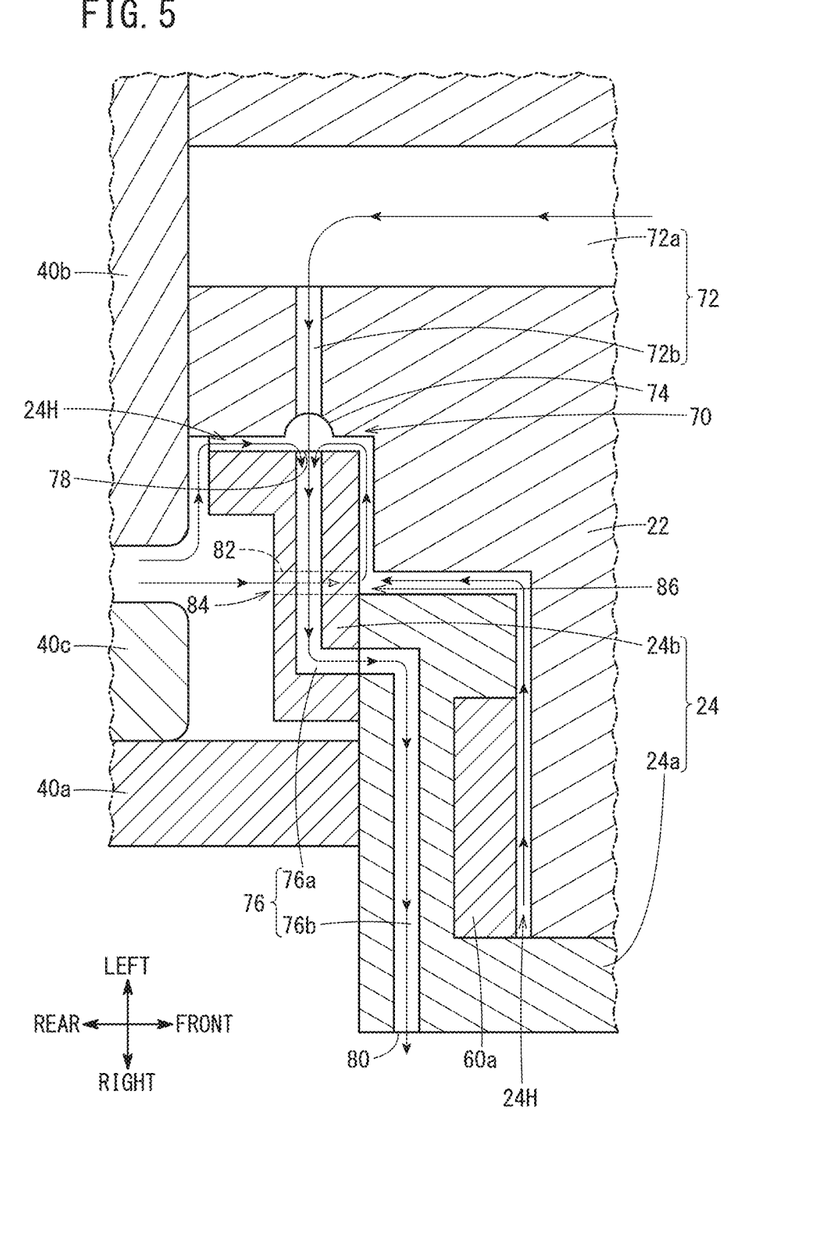
FIG. 5 is a diagram showing the flow of air during suction, indicated by arrows.

Next description will be given on the flow of air when the suctioning source (vacuum pump) is driven. FIG. 5 is a diagram showing the flow of air during suction, indicated by arrows. When the suctioning source (vacuum pump) is driven, the air on the front side of the suction pad 30b (FIG. 2) is sucked into the suctioning passage 30c (FIG. 2) from suction ports OP (FIG. 2), passes through the suctioning passages 30c and flows into the first passage portion 72a of the first guide passage 72 formed in the spindle shaft 22.

The air flowing into the first passage portion 72a flows toward the other end side (rear side) of the spindle shaft 22 and enters the second passage portion 72b. The air flowing into the second passage portion 72b flows out from the outflow port 74 formed in the outer wall of the spindle shaft 22 and goes into the groove 70.

Since the groove 70 is formed annularly along the outer peripheral surface of the spindle shaft 22, the air flowing out from the outflow port 74 flows circumferentially along the outer peripheral surface of the spindle shaft 22. Therefore, even if the outflow port 74 of the first guide passage 72 moves away from the inflow port 78 of the second guide passage 76 (i.e., the ports do not face each other) as the spindle shaft 22 rotates, the air that has flowed out from the outflow port 74 enters the second guide passage 76 from the inflow port 78 provided in the joint portion 24b.

On the other hand, thanks to the suction force of the suctioning source (vacuum pump), the air inside the motor case 40a is drawn into the inner and outer wall clearance from the rear end of the joint portion 24b, and also flows through the third guide passage 82 formed in the joint portion 24b and then enters the inner and outer wall clearance.

The air drawn through the third guide passage 82 into the inner and outer wall clearance serves to restrain the bearing compressed gas supplied between the spindle shaft 22 and the thrust bearing 60a from being drawn into the second guide passage 76 through the inner and outer wall clearance. More specifically, the air inside the motor case 40a that has been drawn into the inner and outer wall clearance through the third guide passage 82 is allowed to preferentially flow into the second guide passage 76, whereby the compressed gas flowing toward the second guide passage 76 is sealed or blocked up, so that only a very small amount of the compressed gas enters the second guide passage 76. Therefore, the gap or clearance between the spindle shaft 22 and the bearing 60 is prevented from being changed by an excessive flow of the bearing compressed gas into the second guide passage 76.

The air that has flowed into the second guide passage 76 passes through the second guide passage 76 and flows out from the outflow port 80 of the second guide passage 76. The air flowing out from the outflow port 80 is suctioned into a suctioning source (vacuum pump) and discharged through the suctioning source.

As described above, in the spindle device 20 of the present embodiment, when air suctioned from the outside flows from the first guide passage 72 into the second guide passage 76, the air flows on the outer wall of the spindle shaft 22 along the outer peripheral surface of the spindle shaft 22. As a result, the outer wall of the spindle shaft 22 is cooled by the air drawn from the outside. Further, heat transfer from the motor 40 to the front side of the spindle shaft 22 is reduced.

Thus, according to the spindle device 20 of the present embodiment, it is possible to reduce a temperature difference generated between the spindle shaft 22 and the spindle housing 24 through which the spindle shaft 22 is inserted. As a result, reduction in machining accuracy can be prevented.

MODIFICATIONS

Though the above embodiment has been described as one example of the present invention, the technical scope of the invention should not be limited to the above embodiment. It goes without saying that various modifications and improvements can be added to the above embodiment. It is also apparent from the scope of the claims that modes added with such modifications and improvements should be incorporated in the technical scope of the invention. Examples in which the above embodiment is modified or improved will be described below.

Modification 1

Figure 6:
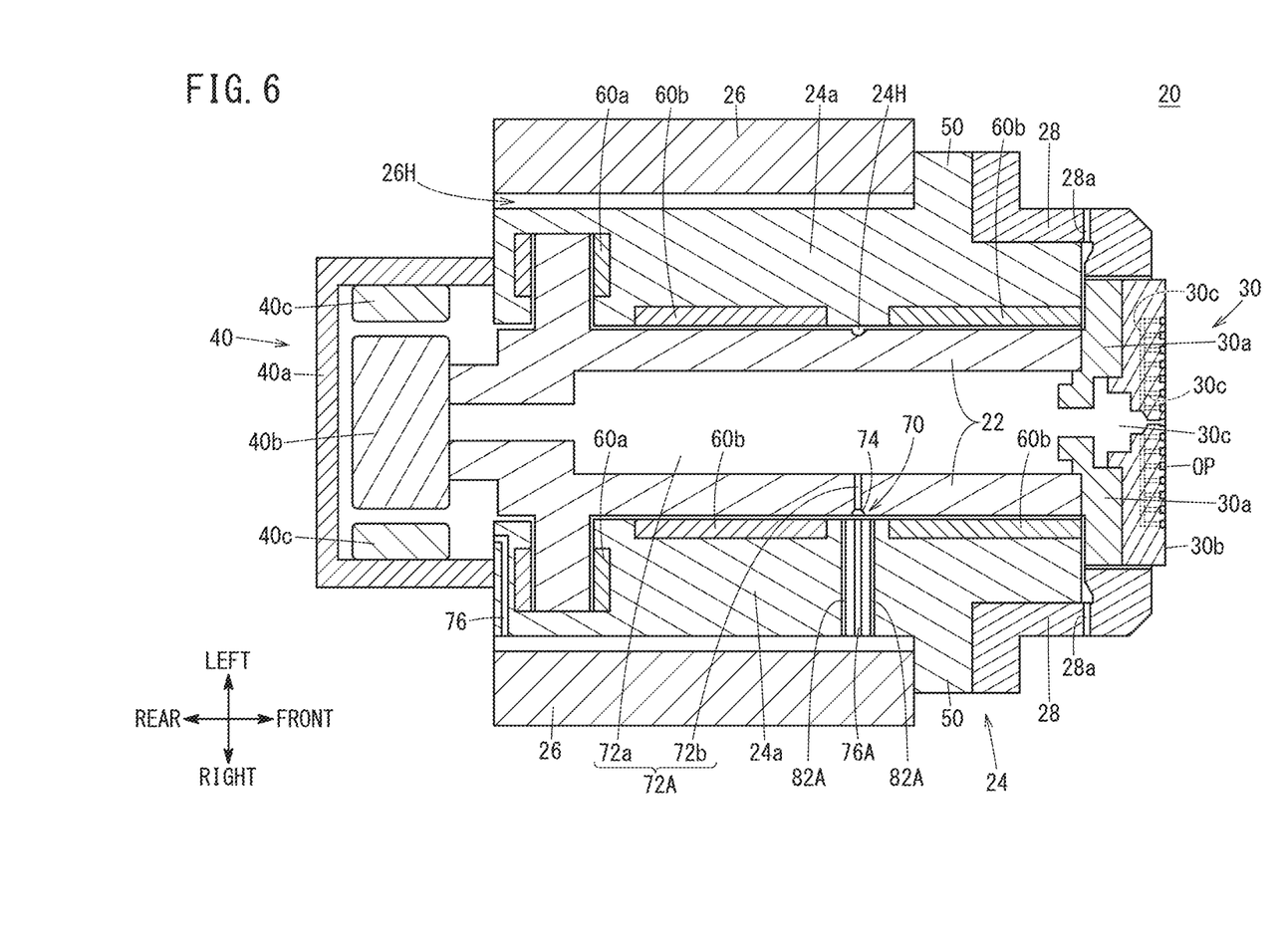
FIG. 6 is a schematic diagram illustrating a first guide passage, a second guide passage and a third guide passage according to Modification 1.

FIG. 6 is a schematic diagram showing a first guide passage 72A, a second guide passage 76A and a third guide passage 82A of Modification 1. In FIG. 6, the same components as those described in the above embodiment are allotted with the same reference numerals and description on the components already described in the above embodiment is omitted as appropriate.

The first guide passage 72A of Modification 1 differs from the above embodiment in that the second passage portion 72b is arranged between the radial bearings 60b provided at the front side and rear side of the spindle shaft 22.

In Modification 1, the groove 70 is formed on the outer peripheral wall of the spindle shaft 22 between the radial bearings 60b provided at the front and rear of the spindle shaft 22, and the outflow port 74 of the first guide passage 72A is formed at the bottom of the groove 70.

Further, the second guide passage 76A and the third guide passage 82A are different from the above embodiment in that they are formed in the housing body 24a.

Specifically, the second guide passage 76A is formed between radial bearings 60b provided at the front and rear sides of the spindle shaft 22 while the inflow port of the second guide passage 76A is formed on the inner wall of the housing body 24a that faces the groove 70 formed on the spindle shaft 22 between the radial bearings. The outflow port of the second guide passage 76A is provided in the outer wall portion of the housing body 24a, as in the above embodiment.

The third guide passage 82A is formed on both the front side and the rear side of the second guide passage 76A, and the inflow ports of the third guide passages 82A on the front and rear sides are formed on the outer wall portion of the housing body 24a. The outflow port of the third guide passage 82A on the front side is arranged on the inner wall of the housing body 24a located between the inflow port of the second guide passage 76A and the radial bearing 60b on the front side. The outflow port of the third guide passage 82A on the rear side is arranged on the inner wall of the housing body 24a between the inflow port of the second guide passage 76A and the radial bearing 60b on the rear side.

In Modification 1, air that is suctioned from the outside and then flows through the first guide passage 72A flows out from the outflow port of the first guide passage 72A, flows through the groove 70, and then enters the second guide passage 76A from the inflow port of the second guide passage 76A, in the same way as in the above embodiment.

On the other hand, thanks to the suction force of the suctioning source (vacuum pump), the air between the housing body 24a and the spindle mount 26 flows through the third guide passage 82A and is drawn into the inner and outer wall clearance. The air drawn into the inner and outer wall clearance serves to restrain the bearing compressed gas supplied between the spindle shaft 22 and the radial bearing 60b from being drawn into the second guide passage 76A through the inner and outer wall clearance. That is, similarly to the above embodiment, the air drawn into the inner and outer wall clearance is allowed to preferentially flow into the second guide passage 76A, whereby the bearing compressed gas flowing toward the second guide passage 76A is sealed or blocked up, so that only a very small amount of the compressed gas enters the second guide passage 76A.

Thus, the first guide passage 72A, the second guide passage 76A and the third guide passage 82A of Modification 1 can also assure an air flow similar to that in the above embodiment. Therefore, the outer wall side of the spindle shaft 22 can be cooled as in the above embodiment.

Modification 2

Figure 7:
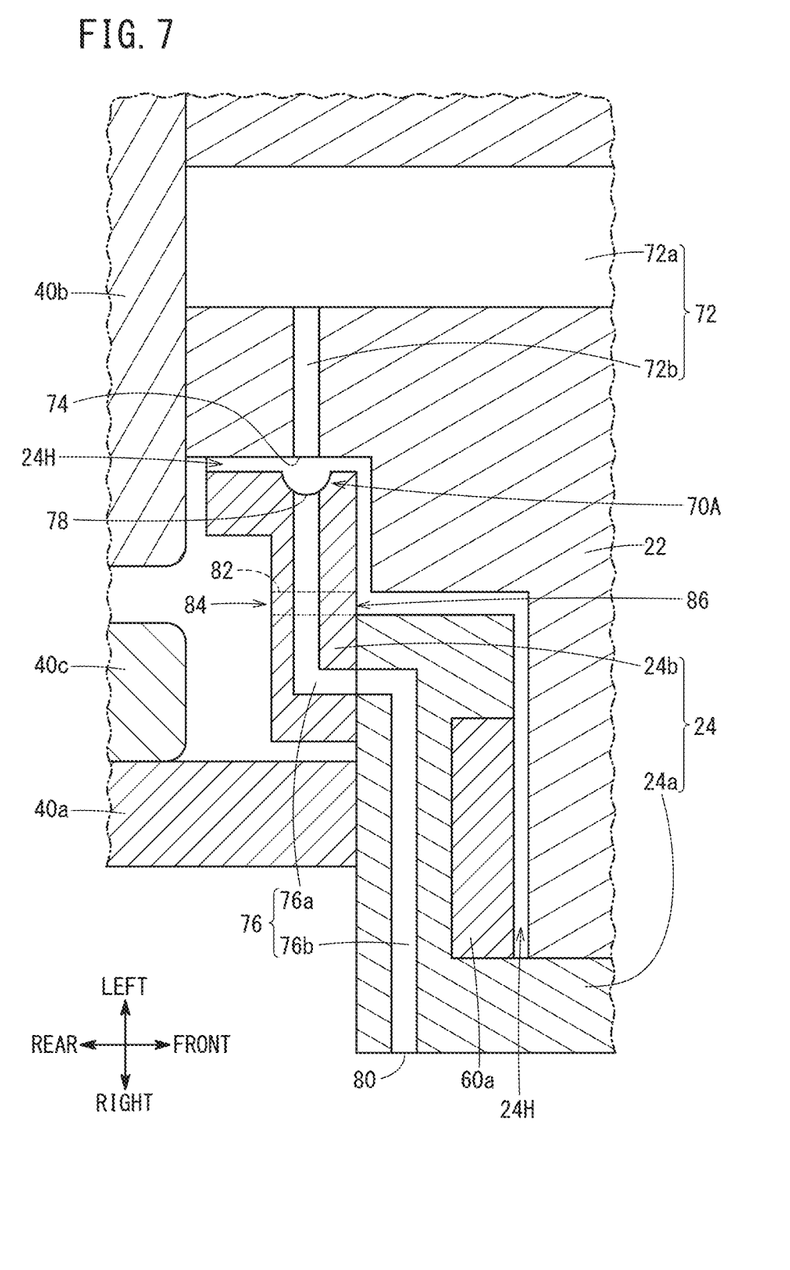
FIG. 7 is a schematic view showing a groove of Modification 2.

FIG. 7 is a schematic diagram showing a groove 70A of Modification 2. In FIG. 7, the same components as those described in the above embodiment are allotted with the same reference numerals and description on the components already described in the above embodiment is omitted as appropriate.

The groove 70A of Modification 2 differs from the groove 70 of the above embodiment in that the groove 70A is formed in the spindle housing 24 (joint portion 24b). Specifically, the groove 70A is formed annularly on the inner wall of the spindle housing 24 (joint portion 24b) that faces the outflow port 74 of the first guide passage 72, along the peripheral surface of the spindle shaft 22. An inflow port 78 of the second guide passage 76 is formed at the bottom of the groove 70A. The bottom of the groove 70A is a depressed portion in the inner wall of the joint portion 24b that forms the groove 70A.

In Modification 2, air flowing out from the outflow port 74 provided on the outer wall of the spindle shaft 22 flows around the outer wall of the spindle shaft 22 through the groove 70A formed on the inner wall of the joint portion 24b. Therefore, also in the case where the groove 70A is formed on the inner wall of the joint portion 24b, the outer wall of the spindle shaft 22 can be cooled by the air suctioned from the outside, as in the above embodiment.

Modification 3

In the above embodiment, the groove 70 is formed on the outer peripheral wall of the spindle shaft 22, and in Modification 2, the groove 70A is formed on the inner wall of the joint portion 24b. However, the groove 70 on the outer peripheral wall of the spindle shaft 22 and the groove 70A on the inner wall of the joint portion 24b may be formed so as to face each other. In short, it is sufficient that at least one of the grooves 70 and 70A is provided in the inner and outer wall clearance.

The grooves 70 and 70A are formed annularly along the peripheral surface of the spindle shaft 22, but may be formed helically along the peripheral surface of the spindle shaft 22.

Modification 4

In the above embodiment, the groove 70 is formed on the outer peripheral wall of the spindle shaft 22. However, the groove 70 may not be provided. When no groove 70 is provided, for example, multiple second passage portions 72b of the first guide passage 72 and multiple joint passage portions 76a of the second guide passage 76 are provided at intervals along the circumferential direction of the spindle shaft 22. In addition, each second passage portion 72b is formed to communicate with the first passage portion 72a while each joint passage portion 76a is formed to communicate with the housing passage portion 76b.

In this way, as in the above-described embodiment, air that is suctioned from the outside and then flows through the first guide passage 72 to the second guide passage 76 can cool the outer wall of the spindle shaft 22. However, in order to cool the outer peripheral wall of the spindle shaft 22 along the peripheral surface thereof, it is preferable that the groove 70 is formed as in the above embodiment.

Modification 5

In the above embodiment, the third guide passage 82 is formed in the joint portion 24b of the spindle housing 24. However, the third guide passage 82 may not be provided. When no third guide passage 82 is provided, for example, a given adjustment target may be adjusted so that only a very small amount of the bearing compressed gas will be suctioned from the inflow port 78 of the second guide passage 76.

Examples of the adjustment target include the suction pressure of the suctioning source (vacuum pump), the gas pressure of the compressed gas supplied to the bearing 60, and the like. However, since adjusting of the adjustment target is likely to become complicated, it is preferable that the third guide passage 82 is formed in the joint portion 24b of the spindle housing 24 in order to omit such adjusting.

Modification 6

The above embodiment and the above Modifications may be arbitrarily combined as long as no contradiction occurs.
[Technical Ideas]

The technical ideas that can be grasped from the above-described embodiment and Modifications will be described below.

The spindle device (20) includes: a spindle housing (24) having a through hole (24H); a spindle shaft (22) inserted in the through hole (24H); a rotating member (30) disposed at one end of the spindle shaft (22) and configured to rotate in linkage with rotation of the spindle shaft (22); and a motor (40) disposed at another end of the spindle shaft (22) and configured to rotate the spindle shaft (22).

The rotating member (30) has, formed therein, a suctioning passage (30c) through which air suctioned from the outside flows.

The spindle shaft (22) has a first guide passage (72, 72A) configured to guide the air flowing through the suctioning passage (30c) to a clearance (inner and outer wall clearance) between the inner wall of the spindle housing (24) defining the through hole (24H) and the outer wall of the spindle shaft (22) facing the inner wall, by way of the interior of the spindle shaft (22).

The spindle housing (24) has, formed therein, a second guide passage (76, 76A) configured to guide the air guided to the clearance, to the outside of the spindle housing (24).

According to the spindle device (20), when air suctioned from the outside flows through the first guide passage (72, 72A) and then flows along the second guide passage (76, 76A), the outer wall of the spindle shaft (22) can be cooled. Therefore, it is possible to reduce the temperature difference arising between the spindle shaft (22) and the spindle housing (24) in which the spindle shaft (22) is inserted. As a result, it is possible to prevent deterioration in machining accuracy.

A groove (70, 70A) may be provided in the clearance along the peripheral surface of the spindle shaft (22) so as to allow the first guide passage (72, 72A) to communicate with the second guide passage (76, 76A).

This configuration makes it possible to cool the outer wall of the spindle shaft (22) along the circumferential direction about the axis. Therefore, the temperature difference arising between the spindle shaft (22) and the spindle housing (24) in which the spindle shaft (22) is inserted can be further reduced.

The spindle housing (24) may have a third guide passage (82, 82A) configured to guide the air outside the spindle housing (24) to the clearance, the third guide passage being formed so as not to communicate with the second guide passage (76, 76A), and an outflow port (86) of the third guide passage (82, 82A) may be formed between a bearing (60) configured to rotatably support the spindle shaft (22) by a compressed gas and an inflow port (78) of the second guide passage (76, 76A).

Thus, the air drawn from the outside into the inner and outer wall clearance through the third guide passage (82, 82A) by the suction pressure of the suction source (vacuum pump) can reduce the flow of the bearing compressed gas into the second guide passage (76, 76A). Therefore, it is possible to prevent the gap or clearance between the spindle shaft (22) and the bearing (60) from being changed.

The spindle housing (24) may include a housing body (24a) provided with the bearing (60) and a joint portion (24b) provided so as to cover the outer peripheral surface of part of the spindle shaft (22) between the housing body (24a) and the motor (40), and the second guide passage (76) may include a joint passage portion (76a) formed in the joint portion (24b) and configured to communicate with the first guide passage (72) and a housing passage portion (76b) formed in the housing body (24a) and configured to allow the joint passage portion (76a) to communicate with the outside of the spindle housing (24).

This configuration makes it possible to efficiently cool the spindle shaft (22) that receives heat from the motor (40).

The joint portion (24b) may be configured to be covered by a motor case (40a) that houses a rotor (40b) and a stator (40c) of the motor (40).

This configuration makes it possible to efficiently cool the spindle shaft (22) that receives heat from the rotor (40b).

The third guide passage (82) may be configured to communicate with the interior of the motor case (40a) housing the rotor (40b) and the stator (40c) of the motor (40).

In this configuration, the air warmed by heat arising from the rotor (40b) attached to the spindle shaft (22) can be drawn into the inner and outer wall clearance through the third guide passage (82, 82A) and caused to flow to the second guide passage (76) through the inner and outer wall clearance, under the suction pressure of the suction source (vacuum pump). Therefore, it becomes easy to prevent heat transfer from the rotor (40b) to the spindle shaft (22).

What is claimed is:

1. A spindle device comprising:
    a spindle housing having a through hole;
    a spindle shaft inserted in the through hole;
    a rotating member disposed at one end of the spindle shaft and configured to rotate in linkage with rotation of the spindle shaft; and
    a motor disposed at another end of the spindle shaft and configured to rotate the spindle shaft, wherein:
    the rotating member has, formed therein, a suctioning passage through which air suctioned from outside flows;
    the spindle shaft has a first guide passage configured to guide air flowing through the suctioning passage to a clearance between an inner wall of the spindle housing defining the through hole and an outer wall of the spindle shaft facing the inner wall, by way of interior of the spindle shaft; and
    the spindle housing has, formed therein, a second guide passage configured to guide air guided to the clearance, to outside of the spindle housing, wherein
    the spindle housing has a third guide passage configured to guide air outside the spindle housing to the clearance, the third guide passage being formed so as not to communicate with the second guide passage; and
    an outflow port of the third guide passage is formed between a bearing configured to rotatably support the spindle shaft by a compressed gas and an inflow port of the second guide passage, wherein:
    the spindle housing includes a housing body provided with the bearing, and a joint portion provided so as to cover an outer peripheral surface of part of the spindle shaft between the housing body and the motor; and
    the second guide passage includes a joint passage portion formed in the joint portion and configured to communicate with the first guide passage, and a housing passage portion formed in the housing body and configured to allow the joint passage portion to communicate with the outside of the spindle housing.

2. The spindle device according to claim 1, wherein:
    a groove is provided in the clearance along a peripheral surface of the spindle shaft; and
    the groove is configured to allow the first guide passage to communicate with the second guide passage.

3. The spindle device according to claim 1, wherein the joint portion is configured to be covered by a motor case configured to house a rotor and a stator of the motor.

4. The spindle device according to claim 1, wherein the third guide passage is configured to communicate with interior of a motor case housing a rotor and a stator of the motor.

* * * * *